United States Patent
Madisetti et al.

(10) Patent No.: US 10,983,768 B2
(45) Date of Patent: Apr. 20, 2021

(54) METHOD AND SYSTEM FOR PERSISTENT HELPERS FOR FUNCTIONS AS A SERVICE (FAAS) IN CLOUD COMPUTING ENVIRONMENTS

(71) Applicant: Vijay Madisetti, Johns Creek, GA (US)

(72) Inventors: Vijay Madisetti, Johns Creek, GA (US); Arshdeep Bahga, Chandigarh (IN)

( * ) Notice: Subject to any disclaimer, the term of this patent is extended or adjusted under 35 U.S.C. 154(b) by 0 days.

(21) Appl. No.: 16/947,357

(22) Filed: Jul. 29, 2020

(65) Prior Publication Data

US 2021/0042098 A1 Feb. 11, 2021

Related U.S. Application Data

(60) Provisional application No. 62/884,690, filed on Aug. 9, 2019, provisional application No. 63/003,915, filed on Apr. 2, 2020.

(51) Int. Cl.
| | |
|---|---|
| *G06F 8/41* | (2018.01) |
| *G06F 16/23* | (2019.01) |
| *G06F 15/173* | (2006.01) |

(52) U.S. Cl.
CPC ............ *G06F 8/423* (2013.01); *G06F 8/4441* (2013.01); *G06F 15/17331* (2013.01); *G06F 16/2379* (2019.01)

(58) Field of Classification Search
CPC .... G06F 8/423; G06F 16/2379; G06F 8/4441; G06F 15/17331
See application file for complete search history.

(56) References Cited

U.S. PATENT DOCUMENTS

| | | | |
|---|---|---|---|
| 2018/0052891 A1* | 2/2018 | Shuster | G06F 16/24568 |
| 2018/0063670 A1* | 3/2018 | Garg | H04W 4/60 |

(Continued)

OTHER PUBLICATIONS

Franciscus et al, "Precomputing architecture for flexible and efficient big data analytics", Vietnam Journal of Computer Science (2018) 5:133-142, (Year: 2018).*

(Continued)

*Primary Examiner* — S. Sough
*Assistant Examiner* — Zengpu Wei
(74) *Attorney, Agent, or Firm* — Daniel C. Pierron; Widerman Malek, PL

(57) ABSTRACT

A method for improving the performance of functions-as-a-service including receiving a first function call including a first argument, performing a first function responsive to the first argument including by the first function call, producing a first function result, generating a first precomputation argument that differs from the first argument responsive to the first function call, executing a first persistent function responsive to the first precomputation argument, the persistent function including performing at least one precomputation operation, the at least one precomputation operation including performing the first function responsive to the first precomputation argument, producing a first precomputation result, storing the first precomputation result, receiving a second function call including a second argument, comparing the second argument to the first precomputation argument, and upon determining the second argument is identical to the first precomputation argument, transmitting the first precomputation result from a source of the second function call.

16 Claims, 14 Drawing Sheets

(56) References Cited

U.S. PATENT DOCUMENTS

| | | | | |
|---|---|---|---|---|
| 2018/0173502 A1* | 6/2018 | Biskup | .................... | G06F 8/71 |
| 2019/0042315 A1* | 2/2019 | Smith | .................... | G06F 9/5072 |
| 2019/0179678 A1* | 6/2019 | Banerjee | .............. | G06F 9/5072 |
| 2019/0227978 A1* | 7/2019 | Guim Bernat | ........ | H04L 63/102 |
| 2019/0317865 A1* | 10/2019 | Heidel | ................ | G06F 11/1471 |
| 2020/0052982 A1* | 2/2020 | Nainar | .................. | H04L 43/028 |
| 2020/0225982 A1* | 7/2020 | Jung | ........................ | H04L 67/10 |

OTHER PUBLICATIONS

Van Eyk et al, "A SPEC RG Cloud Group's Vision on the Performance Challenges of FaaS Cloud Architectures", [Online], 2018, pp. 21-24, [Retrieved from internet on Feb. 1, 2021], <https://dl.acm.org/doi/pdf/10.1145/3185768.3186308> (Year: 2018).*

Sewak et al, "Winning in the era of Serverless Computing and Function as a Service", [Online], 2018, pp. 1-5, [Retrieved from internet on Feb. 1, 2021], <https://ieeexplore.ieee.org/stamp/stamp.jsp?tp=&arnumber=8529465> (Year: 2018).*

Spillner, "Snafu: Function-as-a-Service (FaaS) Runtime Design and Implementation", [Online], 2017, pp. 1-15, [Retrieved from internet on Feb. 1, 2021], <https://arxiv.org/pdf/1703.07562.pdf> (Year: 2017).*

AWS Lambda, https://aws.amazon.com/lambda/, Accessed Apr. 2, 2020.

Azure Functions, https://azure.microsoft.com/en-us/services/functions/, Accessed Apr. 2, 2020.

Google Cloud Functions, https://cloud.google.com/functions/, Accessed Apr. 2, 2020.

OpenFaas, https://github.com/openfaas/faas, Accessed Apr. 2, 2020.

Kubeless, https://github.com/kubeless/kubeless, Accessed Apr. 2, 2020.

Fission, https://github.com/fission/fission, Accessed Apr. 2, 2020.

Apache OpenWhisk, https://github.com/apache/openwhisk, Accessed Apr. 2, 2020.

Baldini, Ioana, et al. Serverless computing: Current trends and open problems, Research Advances in Cloud Computing. Springer, Singapore, 2017. 1-20.

Van Eyk, Erwin, et al. A SPEC RG cloud group's vision on the performance challenges of FaaS cloud architectures, Companion of the 2018 ACM/SPEC International Conference on Performance Engineering. ACM, 2018.

Tosatto, Andrea, Pietro Ruiu, and Antonio Attanasio, Container-based orchestration in cloud: state of the art and challenges, 2015 Ninth International Conference on Complex, Intelligent, and Software Intensive Systems. IEEE, 2015.

Peinl, Ren, Florian Holzschuher, and Florian Pfitzer, Docker cluster management for the cloud-survey results and own solution, Journal of Grid Computing 14.2 (2016): 265-282.

Elham Azari, Hakduran Koc Improving performance through path-based hardware/software partitioning, Fifth International Conference on Digital Information Processing and Communications (ICDIPC), 2015.

* cited by examiner

PRIOR ART

```
import base64
import json
import boto3
import cPickle
import time
import re dynamodb = boto3.resource('dynamodb', region_name="us-east-1")
table = dynamodb.Table('Tweets')

TERMS={}
sent_file = open('AFINN-111.txt')
sent_lines = sent_file.readlines()
for line in sent_lines:
    s = line.split("\t")
    TERMS[s[0]] = s[1].strip()

sent_file.close()

def findsentiment(tweet):
    splitTweet=tweet.split()
    sentiment=0.0
    for word in splitTweet:
        if TERMS.has_key(word):
            sentiment = sentiment+ float(TERMS[word])
    return sentiment def lambda_handler(event, context):
    for record in event['Records']:
        payload = base64.b64decode(record['kinesis']['data'])
        recordjson=cPickle.loads(payload)
        tweet=json.loads(recordjson)
        text = tweet['text'].encode('utf-8',errors='ignore')
        sentiment=findsentiment(text)

output_json={}
        output_json["timestamp"]=int(tweet['timestamp_ms'])
        output_json["tweet"]= text
        output_json["sentiment"]=str(sentiment)

table.put_item(Item=output_json)

return 'Successfully processed {} records.'.format(len(event['Records']))
```

```
import base64
import json
import boto3
import cPickle
import time
import re
from textblob import TextBlob dynamodb = boto3.resource('dynamodb', region_name="us-east-1")
table = dynamodb.Table('Tweets')

def findsentiment(tweet):
    result = TextBlob(tweet)
    return result.sentiment.polarity def lambda_handler(event, context):
    for record in event['Records']:
        payload = base64.b64decode(record['kinesis']['data'])
        recordjson=cPickle.loads(payload)
        tweet=json.loads(recordjson)
        text = tweet['text'].encode('utf-8',errors='ignore')
        sentiment=findsentiment(text)

output_json={}
        output_json["timestamp"]=int(tweet['timestamp_ms'])
        output_json["tweet"]= text
        output_json["sentiment"]=str(sentiment)

table.put_item(Item=output_json)

return 'Successfully processed {} records.'.format(len(event['Records']))
```

```python
import base64
import json
import boto3
import cPickle
import time
import re dynamodb = boto3.resource('dynamodb', region_name="us-east-1")
table = dynamodb.Table('Tweets')

comprehend_client = boto3.client('comprehend')

def findsentiment(tweet):
    response = comprehend_client.detect_sentiment(
                Text=tweet,
                LanguageCode='en'
                )
    sentiment =  response['Sentiment']
    if sentiment=='POSITIVE':
        sentimentScore = 1
    elif sentiment=='NEGATIVE':
        sentimentScore = -1
    else:
        sentimentScore = 0
    return sentimentScore def lambda_handler(event, context):
    for record in event['Records']:
        payload = base64.b64decode(record['kinesis']['data'])
        recordjson=cPickle.loads(payload)
        tweet=json.loads(recordjson)
        text = tweet['text'].encode('utf-8',errors='ignore')
        sentiment=findsentiment(text)

output_json={}
        output_json["timestamp"]=int(tweet['timestamp_ms'])
        output_json["tweet"]= text
        output_json["sentiment"]=str(sentiment)

table.put_item(Item=output_json)

return 'Successfully processed {} records.'.format(len(event['Records']))
```

FIG. 7

```
Set of nodes which are not persisted:
NP_set={n_1, n_2, n_3, .....}
Set of nodes which are persisted: PH_set={}
Set of Profit Values for nodes: PV_set={}
Memory Used: M_U=0
Total Memory available: M_T
for n_i in NP_set :
    P_i = T_i' - T_i
    PV_set= PV_set +{(P_i,n_i)}

PV_set =Sort (PV_set) by P_i while M_U < M_T:
    for (P_i,n_i) in PV_set :
        if (M_U+M_ni) <M_T :
            PH_set = PH_set + {n_i}
            NP_set = NP_set - {n_i}
            M_U = M_U+M_ni
```

FIG. 10

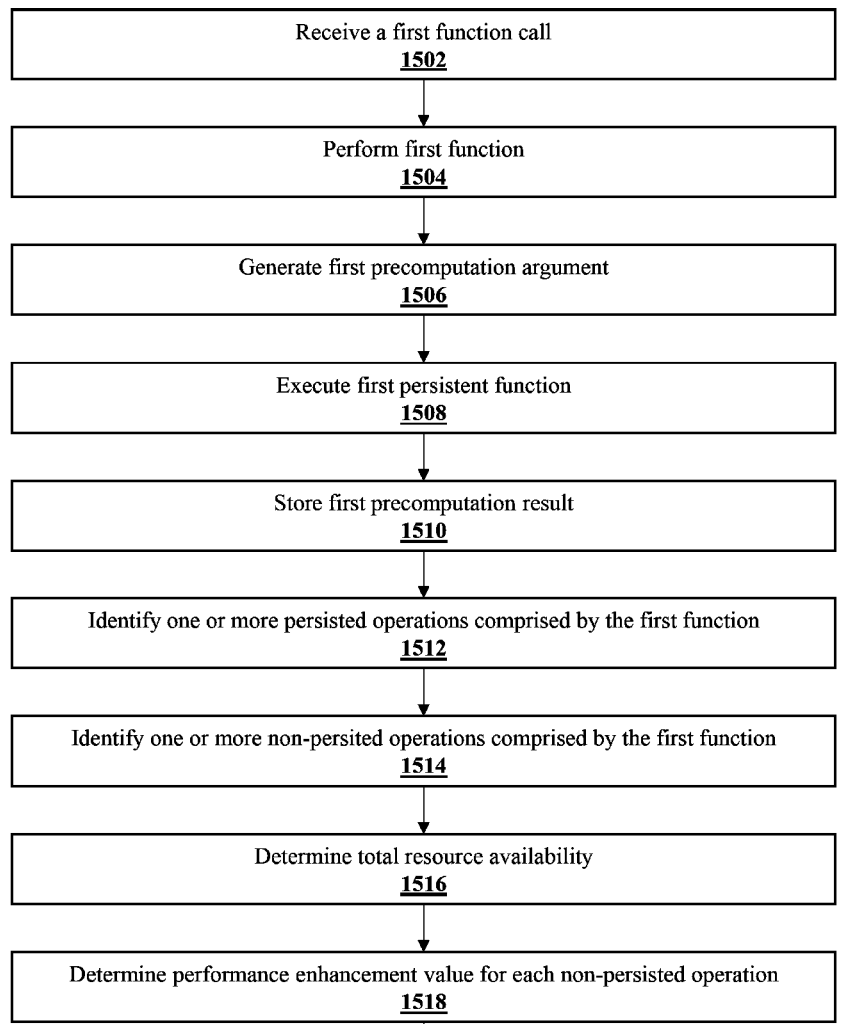

METHOD AND SYSTEM FOR PERSISTENT HELPERS FOR FUNCTIONS AS A SERVICE (FAAS) IN CLOUD COMPUTING ENVIRONMENTS

RELATED APPLICATIONS

This application claims the benefit under 35 U.S.C. § 119(e) of U.S. Provisional Patent Application Ser. No. 62/884,690 filed on Aug. 9, 2019 and titled Persistent Helpers for Functions as a Service (FaaS) in Cloud Computing Environments and U.S. Provisional Patent Application Ser. No. 63/003,915 filed on Apr. 2, 2020 titled Persistent Helpers for Cloud Environments—RAAS, the entire contents of which are incorporated herein by reference except to the extent disclosure therein is inconsistent with disclosure herein.

FIELD OF THE INVENTION

The present invention relates to persistent helper functions in a serverless offering.

BACKGROUND

Serverless Computing or Functions-as-a-Service (FaaS) is an execution model for cloud computing environments where the cloud provider executes a piece of code (a function) by dynamically allocating resources. The serverless or FaaS model is suitable for applications such as Internet of Things (IoT), artificial intelligence, real-time processing, and data analytics.

In the serverless computing model, the code is structured into functions. The functions are triggered by events such as an HTTP request to an API gateway, a record written to a database, a new file uploaded to cloud storage, a new message inserted into a messaging queue, a monitoring alert, and a scheduled event. When a function is triggered by an event, the cloud provider launches a container and executes the function within the container.

Some important concepts related to serverless computing are described as follows:

Push and Pull Models of Invocation: Functions in a serverless offering are invoked by event sources, which can be a Cloud service or a custom application that publishes events. The event-based invocation has two modes: push and pull.

Concurrent Execution: Concurrent execution refers to the number of executions of the functions which are happening at the same time. Cloud providers set limits on concurrent executions.

Execution Duration: Cloud providers set a timeout limit under which a function execution must complete. If the function takes a long time to execute than the timeout limit, the function execution is terminated. This makes the serverless computing model more suitable for real-time or short running operations rather than long-running batch operations.

Container Reuse: Cloud providers typically use containers for executing the functions in their serverless offerings. A container helps in isolating the execution of a function from other functions. When a function is invoked for the first time (or after a long time), a container is created, the execution environment is initialized, and the function code is loaded. The container is reused for subsequent invocations of the same function that happen within a certain period.

Cold and Warm Functions: When a function has not been executed for a long time or is being executed for the first time, a new container has to be created, and the execution environment has to be initialized. This is called a 'cold start'. Cold start can result in a higher latency as a new container has to be initialized. The cloud provider may reuse the container for subsequent invocations of the same functions within a short period. In this case, the function is said to be warm and takes much less time to execute than a cold start.

Serverless FaaS offerings have limitations such as cold starts and timeout limits. Examples of offerings with such limitations include both commercial services such as Amazon Web Services (AWS) Lambda, Azure Functions, and Google Cloud functions, as well as open source serverless frameworks including OpenFaaS, Kubeless, and Apache OpenWhisk. Other challenges include provisioning and requesting overhead, pricing models and orchestration. Services such as Azari and Koc present an approach for partitioning tasks between hardware and software to improve performance. The invention presented below represents an improvement over these services.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for Persistent Helpers for Functions as a Service (FaaS) in Cloud Computing Environments.

In some embodiments, the method may further comprise Persistent Helpers that provide the following features: a new computing and execution model for cloud environments called Result-as-a-Service (RaaS) is proposed over FaaS, which reduces the computational cost and overhead while achieving high availability; an approach for optimizing FaaS offerings by introducing a library of 'persistent helper functions'; and an analytical model and an algorithm for maximizing the performance in a serverless offering.

In some embodiments, the method may further comprise Persistent Helper Functions providing the following features:

Stateful: A key differentiating factor of persistent helper functions from existing FaaS offerings is that the persistent helper functions can be stateful, whereas functions are stateless and any state information has to be separately maintained in a state database.

Billing & Subscription Models: Another differentiating factor of persistent helper functions from existing FaaS offerings is that the persistent helper functions can have different billing and subscription models such as the number of requests or events processed, duration or time period, amount of computing and memory resources used, and amount of data processed. The third parties providing persistent helper functions can share royalty with the cloud provider that provides the serverless offering. Identifier-based authentication and licensing models can be used, where instances of Helper functions and instances of calling serverless functions can be identified uniquely through individual and group/role identifiers.

Continuous Training: Another differentiating factor of persistent helper functions from existing FaaS offerings is that the persistent helper functions can be continuously trained and optimized independently of the functions which use the persistent helper functions.

Distribution and Management: Persistent helper functions are made available through a functions store (like an app store). Developers can choose persistent helper functions from the functions store and select among various subscription, billing and licensing models. Each instance of a persistent helper function is identified by a unique ID and may be used by one or more functions. The user is provided a dashboard that shows the status of persistent helper functions instantiated by the user, their cost and other runtime expenses and workload utilization. There is a dashboard console for users to configure helper instances.

Scaling: Persistent helper functions are scaled elastically. There is a load balancer frontend to the persistent helper functions manager. It spawns new helper instances and goes through a lifecycle approach to support functions.

Execution: The persistent helper functions could be executed on GPU or ASICs to speed up the execution.

Sharing: The persistent helper functions can be shared across multiple functions.

Configuration and Customization: The persistent helper functions can be configured or customized to be used in different functions.

Third Party Libraries: The persistent helper functions may use a third-party library or may be developed by the user.

A method for optimizing FaaS offerings is presented that introduces a library of persistent helper functions that are not billed like the functions in a FaaS. The persistent helper functions can "turbo" boost the execution by prefetching data and precomputing logic. In between successive calls to a function, a persistent function can help in successive calls by precomputing the functions for different possible arguments and then distributing the results when a matching function call is found. Specifically, upon receiving a first function call comprising a first argument and performing a first function responsive to the first function call, the persistent helper functions may perform a precomputation operation comprising performing the first function call using a first precomputation argument that differs from the first argument, generating a first precomputation result. The first precomputation result may be stored and retrieved upon receiving a subsequent function call having an argument identical to the first precomputation argument. This makes function calls faster and also reduces load since common computation is shared by the cloud provider across millions of calls that can share the common precomputed values. Different third parties can compete to provide helper functions that different retail users can leverage, thus creating a Persistent Functions Store like an 'app store'.

There are two reasons why RaaS over FaaS is attractive to dampen the challenges observed in FaaS. Firstly, as a consequence of cost-savings to scale up, the proposed pricing model is detached from the computational process expected by the on-demand request and likely to be much lower when users are incurring on the shared service rather than individual function with the same purpose. Secondly, is it is demonstrated that the round-trip latency is significantly reduced after the precomputation of the expected value achieving high availability on request. The new model aims to enable the requirements of low-latency applications such as smart metering, smart cities, autonomous vehicles, wearable devices, among others, to reduce the cost of computing-intensive tasks.

An App Store of Persistent Helper Functions from third parties and cloud providers can help accelerate and optimize the use of serverless applications in the cloud context. Sophisticated identification, linkage, and lifecycle licensing modules allow applications and helper functions to be scaled, priced competitively, and also allow privacy through authentication and encryption.

The new computing and execution model for cloud environments called Result-as-a-Service (RaaS) is presented which reduces the computational cost and overhead while achieving high availability. In between successive calls to a function, a persistent function can help in successive calls by precomputing the functions for different possible arguments and then distributing the results when a matching function call is found.

Further embodiments of the invention are directed to a method for improving the performance of functions-as-a-service comprising receiving a first function call comprising a first argument, performing a first function responsive to the first argument comprised by the first function call, producing a first function result, generating a first precomputation argument that differs from the first argument responsive to the first function call, and executing a first persistent function responsive to the first precomputation argument, the persistent function comprising performing at least one precomputation operation, the at least one precomputation operation comprising performing the first function responsive to the first precomputation argument, producing a first precomputation result, storing the first precomputation result. The method further comprises receiving a second function call comprising a second argument, comparing the second argument to the first precomputation argument, and upon determining the second argument is identical to the first precomputation argument, transmitting the first precomputation result from a source of the second function call.

In some embodiments, the method may further comprise storing the first precomputation result in memory. In some embodiments, the method may further comprise storing the first precomputation result in a result database. In some embodiments, the first persistent function may be stateful.

In some embodiments, the method may further comprise identifying one or more operations comprised by the first function that are persisted, defining persisted operations, identifying one or more operations comprised by the first function that are not persisted, and defining non-persisted operations, determining a total resource availability. The method may further comprise determining a performance enhancement value for each non-persisted operation by comparing the time to perform the non-persisted operation with the time to perform the non-persisted operation if it were persisted, assigning a resource cost to each performance enhancement value, and recursively reassigning non-persisted operations as persisted operations in order of their performance enhancement values, defining reassigned operations, until the sum of the resource costs for the reassigned operations would exceed the total resource availability. Furthermore, the total resource availability may be at least one of a total memory availability, a total read/write availability, and a storage availability, and the resource cost may be at least one of memory used in persisting the non-persisted operation, read/write utilization in persisting the non-persisted operation, and storage utilized in persisting the operation. Additionally, the non-persisted operations may be reassigned as persisted operations responsive to having the largest performance enhancement value. Furthermore, in some embodiments, the non-persisted operations may be reassigned as persisted operations responsive to having the largest ratio of performance enhancement value to resource cost.

In some embodiments, the method may further comprise retrieving the first persistent result using remote direct memory access.

In some embodiments, the method may further comprise caching an image of the first function, creating a first container consisting of the first function, storing the first container in a function container pool, caching an image of the first persistent function, creating a first persistent container consisting of the first persistent function, and storing the first persistent container in a persistent function container pool.

Additionally, in some embodiments, executing the first persistent function may comprise executing the first persistent container. Furthermore, the method may further comprise retrieving the first persistent result using remote direct memory access.

Further embodiments may be directed to a results-as-a-service (RaaS) system for improving functions-as-a-service operation comprising a server, the server comprising a function container pool comprising a plurality of function containers, a resource manager configured to launch and manage containers within the function container pool, a persistent function container pool comprising a plurality of persistent function containers, and a persistent functions manager configured to launch and manage the persistent function container pool. The system may further comprise a container registry positioned in communication with the server comprising a record of all functions registered with the RaaS system and a catalog of persistent functions registered with the RaaS system positioned in communication with the server.

In some embodiments, the server further comprises a resource manager comprising a scheduler and a container launcher. The server may further comprise an event controller configured to invoke functions comprised by the function container pool.

In some embodiments, the server may be one of a plurality of servers and the system further comprises a load balancer configured to route requests to a server of the plurality of servers, a function metadata database, a message queue configured for asynchronous execution, and an object store database configured to store logs from the plurality of servers.

BRIEF DESCRIPTION OF THE DRAWINGS

FIG. 5 is an illustration an existing approach for computing sentiments for the reference social media analytics application.

FIG. 6 is an illustration an existing approach for computing sentiments for the reference social media analytics application.

FIG. 7 is an illustration an existing approach for computing sentiments for the reference social media analytics application.

FIG. 10 is an illustration of an algorithm to maximize the performance by using persistent helper functions given constraints according to an embodiment of the invention.

FIGS. 15A-B are a flow chart illustrating a method according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
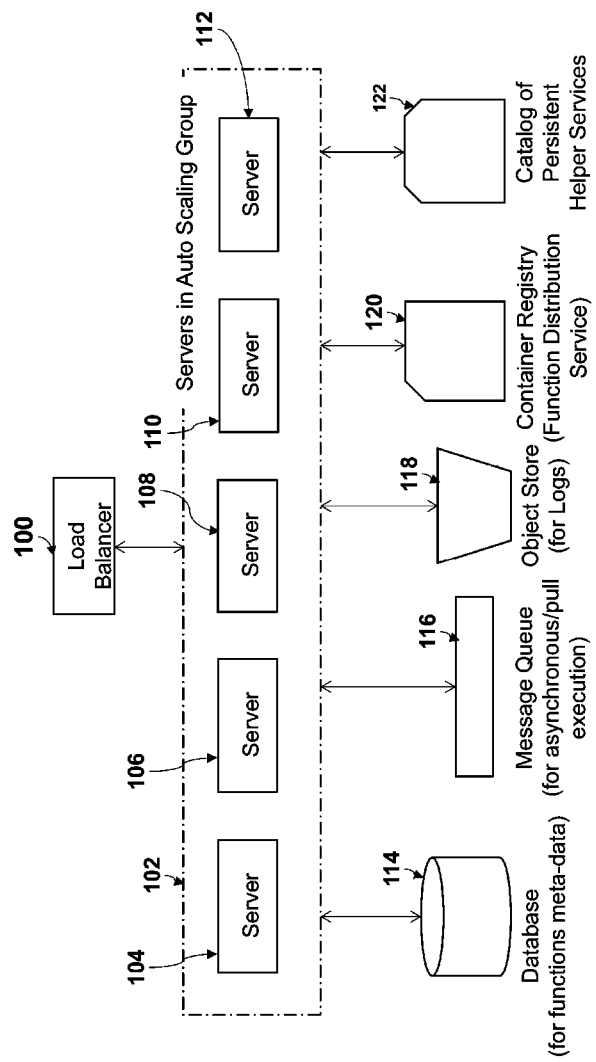
FIG. 1 is a schematic representation of an architecture of an RaaS offering according to an embodiment of the invention.

Referring now to FIG. 1, the architecture of a RaaS offering, is described in more detail. The RaaS architecture comprises a load balancer 100 configured to route events/requests to servers 104, 106, 108, 110, 112, which ultimately invoke the functions which are executed within containers running on the servers. If a server has a hot container for a function already running, the request is routed to that server. For synchronous requests, the load balancer 100 keeps a connection open once a request is made and waits for a server to return a response from the function handling the event.

The RaaS architecture further comprises one or more RaaS server (such as 104, 106, 108, 110, 112) configured to execute functions within containers and returns a response to clients. The RaaS servers 104, 106, 108, 110, 112 are placed under an auto-scaling group 102. Response from function execution is sent back to the load balancer 100.

The RaaS architecture further comprises a database 114 configured to store function meta-data, a message queue 116 is configured for asynchronous/pull execution, and an object store 118 is configured for storing logs.

The source code of functions and persistent helpers is packaged as a container image. A container registry 120 (or functions distribution service) comprised by the RaaS architecture maintains a record of all the functions registered with the RaaS architecture. Similarly, a catalog of persistent helper functions 122 comprised by the RaaS architecture is maintained. As the source code of functions and persistent helpers is packaged as container images, these can be implemented in any language supported by the container runtime.

Figure 2:
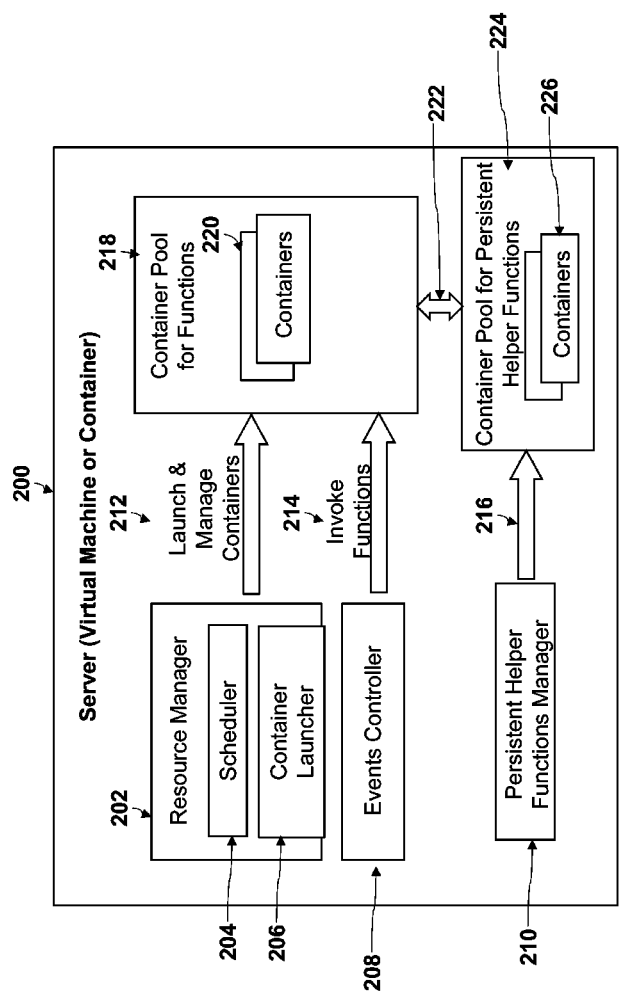
FIG. 2 is schematic representation of an architecture of an RaaS Server with support for persistent helper functions according to an embodiment of the invention.

Referring now to FIG. 2, the architecture of a RaaS Server with support for persistent helper functions, is described in more detail. The RaaS server includes a resource manager 202 which launches and manages a container pool 218 for execution of functions. The resource manager includes scheduler 204 and container launcher 206 components. An events controller 208 invokes the functions when new events or triggers are received. The event-based invocation has two modes: push and pull. In the push model, a cloud service publishes events that invoke the functions. The pull model works for poll-based sources (such as message queues). In the pull model, the server polls the source and then invokes the function when records are detected on that source. For poll-based sources, an event source mapping is created and stored in the FaaS database. The event source mapping describes how the source is associated with a function. The server also handles CRUD (create, read, update and delete) operations for setting up functions. When a server runs a function for the first time, it caches the function image and starts a hot container. If a container is already running, the server routes the function call to the running container. The server maintains a pool of containers for persistent helper functions 224, which are independent of the containers which execute the functions. A persistent helper functions manager 210 manages the container pool 224 for persistent helper functions.

Persistent Helper functions executing within containers can be accelerated using Remote Direct Memory Access (RDMA). RDMA has been demonstrated to improve network performance in containerized environments achieving higher throughput, lower latency, and less CPU overhead. RDMA enables zero-copy networking such that data can be sent and received directly between applications without being copied between network layers. Further, persistent helper functions can benefit from network protocols that support RDMA including InfiniBand (IB) and RDMA Over Converged Ethernet (RoCE). Specifically, persistent helper functions may benefit from RDMA by the retrieval of the results of persistent helper functions, defined as persistent results, using RDMA.

Figure 3:
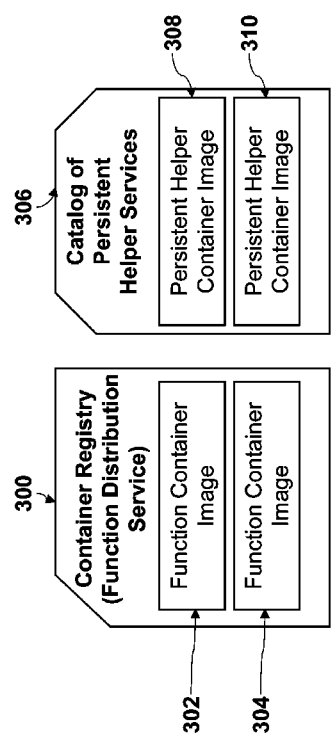
FIG. 3 is an illustration of the packaging and delivery approach for persistent helper functions according to an embodiment of the invention.

Referring now to FIG. 3, the packaging and delivery approach for persistent helper functions, is described in more detail. The source code of functions and persistent helpers is packaged as a container images 302, 304. A container registry 300 (or functions distribution service) maintains a record of all the functions registered with the RaaS offering. Similarly, a catalog of persistent helper functions 306 in the RaaS offering is maintained. As the source code of functions and persistent helpers is packaged as container images 308, 310, these can be implemented in any language supported by the container runtime.

Figure 4:
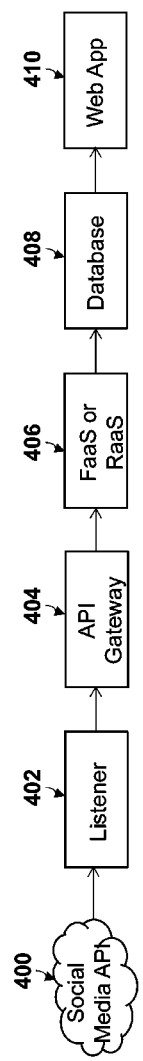
FIG. 4 depicts a method of a reference application for social media sentiment analysis according to an embodiment of the invention.

Referring now to FIG. 4, a reference application for social media sentiment analysis, is described in more detail. The reference application computes sentiments of social media posts such as tweets from Twitter. A custom listener component 402 fetches tweets using the Twitter API 400 and posts the tweets to an API gateway endpoint 404 which triggers a function by generating a function call in a serverless offering 406 (FaaS or RaaS) to compute sentiment of each tweet. The computed sentiments, i.e. function results, are stored in a database 408. A web application 410 presents the sentiment analysis results. Different approaches can be used to compute sentiment of tweets such as a sentiment analysis function that uses a sentiment lexicon, a third-party library such as Python TextBlob, or a web-based NLP service such as AWS Comprehend.

Referring now to FIG. 5, an existing approach for computing sentiments for the reference social media analytics application, is described in more detail. In this approach 500, a sentiment analysis function is included as a part of the lambda function package which uses a sentiment lexicon such as AFINN.

Referring now to FIG. 6, an existing approach for computing sentiments for the reference social media analytics application, is described in more detail. In this approach 600, a third party library such as Python TextBlob library is used which is packaged along with the lambda function.

Referring now to FIG. 7, an existing approach for computing sentiments for the reference social media analytics application, is described in more detail. In this approach 700, a web-based NLP service such as AWS Comprehend is used.

Figure 8:
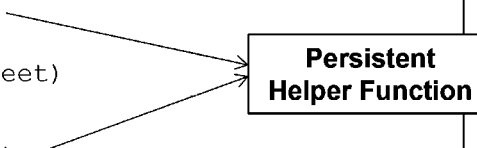
FIG. 8 is an illustration of an approach for computing sentiment for social media analytics applications using persistent helper functions according to an embodiment of the invention.

Referring now to FIG. 8, the new approach using Persistent Helper Function for computing sentiment for the reference social media analytics application, is described in more detail. In this approach 800, a persistent helper service is set up, which stores the computed sentiments in memory or a database, and the function which processes the tweets uses this service. Whenever there is a request from the function to persistent helper to compute sentiment, i.e. a first function call comprising a first argument is received, the persistent helper service checks if the tweet has been evaluated before. Specifically, the persistent helper service checks if a tweet with the same content (i.e. first argument) has been evaluated before. If the sentiment/first argument is not found in memory or database, it is computed and stored. Otherwise, if the sentiment had previously been computed, the stored results are returned, thus saving time by avoiding a redundant repeated computation. Similarly, when a second function call comprising a second argument is received, the persistent helper service checks if a tweet having the same argument been evaluated before. Such an evaluation may be one of an evaluation responsive to a function call comprising an argument that was received previously, or an evaluation responsive to a persistent function using a precomputation argument that differs from an argument received in a function call. The result executing a function on the precomputation argument, producing a precomputation result, may be stored as described above, similar to storage of results from executing functions responsive to a function call, in memory or in a database. Persistent Helper Functions:

Can be stateful

Can have different billing & subscription models

Can be trained continuously

Can be executed on CPUs or ASICs

Can be shared across multiple lambda functions

Can be customized for a lambda function

May use a third-party library or may be developed by the user itself

Can be managed through a persistent helper functions dashboard

Can be scaled elastically

While the example of sentiment is described herein, it is contemplated that the RaaS system described herein may be used for a wide variety of applications and not exclusively for sentiment analysis, nor may such sentiment analysis be constrained to social media applications, but instead is applicable to all instances where sentiment analysis is desired, including, but not limited to, other types of correspondence.

Figure 9:
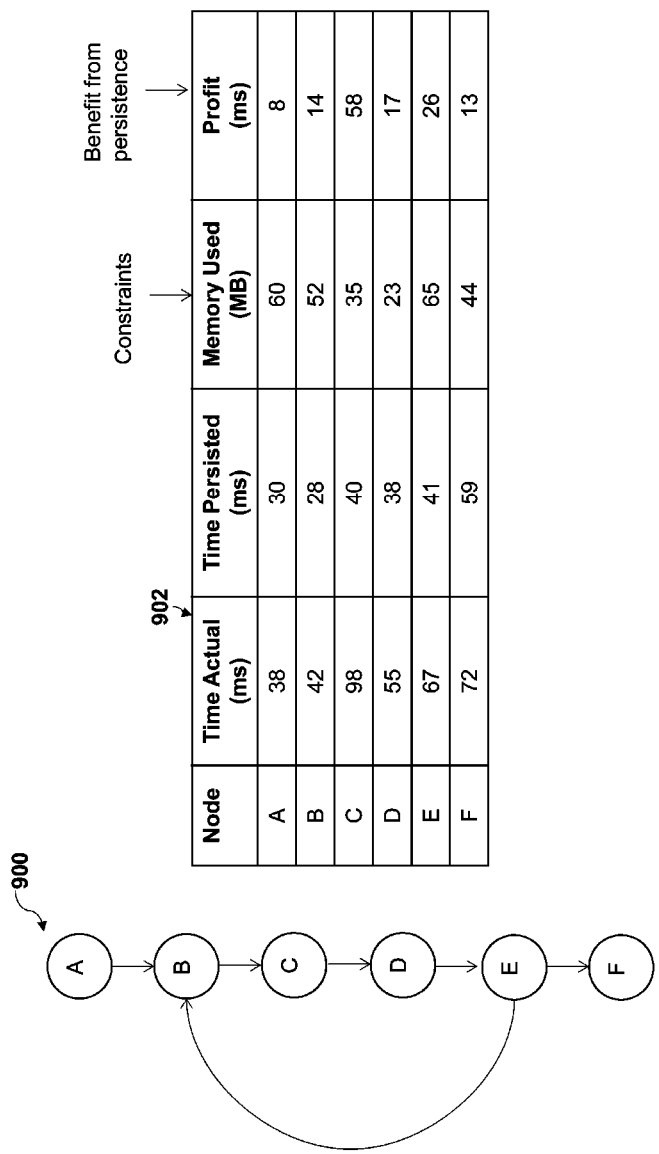
FIG. 9 is a graphical representation of a Control Data Flow for modeling speed up in a RaaS offering, according to an embodiment of the invention.

Referring now to FIG. 9, a Control Data Flow for modeling speed up in a RaaS offering, is described in more detail. A function in a serverless offering is represented as a Control Data Flow Graph (CDFG) 900. There are two types of nodes in a CDFG: data flow nodes and decision nodes. A data flow node is a piece of code that has a single entry point, single exit point and no condition. In contrast, a decision node is a piece of code which has at least one condition. Nodes can be persisted and the profit value determines the benefit from persistence in memory or database. For each node in the CDFG, the actual execution time $T_i'$ and the execution time of a persisted version $T_i$ is determined as shown in table 902. The profit value for each node is the difference $(T_i'-T_i)$.

Referring now to FIG. 10, an algorithm to maximize the performance by using persistent helper functions given constraints, is described in more detail. The algorithm 1000 partitions portions/operations of a function (nodes in CDFG representation of a function) into two sets—persisted operations and not-persisted operations. The goal of this algorithm is to maximize the performance by using persistent helper functions given constraints such as memory used, database read/write capacity used or database size. Accordingly, the algorithm may further determine a total resource availability, the resource being at least one of memory used, database read/write capacity used or database size. The speedup from using persistent helpers can then be computed by determining a performance enhancement value for each non-persisted operation by comparing the time to perform the non-persisted operation with the time to perform the non-persisted operation if it were persisted and assigning a resource cost to each performance enhancement value, the resource cost being the resource utilization incurred by persisting the non-persisted operation. A formula showing this computation is as follows: $(A-(B+C))/A$, where A is the total time for execution of all nodes if no persistence is used, B is the total time for execution of nodes in the persisted set, and C is the total time for execution of nodes in the non-persisted set.

Upon determining the performance enhancement value and resource cost for each non-persisted operation, the non-persisted operations may be recursively reassigned as persisted operations in order of their performance enhancement values, defining reassigned operations, until the sum of the resource costs for the reassigned operations would exceed the total resource availability. In some embodiments, the non-persisted operations may be reassigned as persisted operations responsive to having the largest performance enhancement value. In some embodiments, the non-persisted operations may be reassigned as persisted operations responsive to having the largest ratio of performance enhancement value to resource cost.

Figures 11, 12:
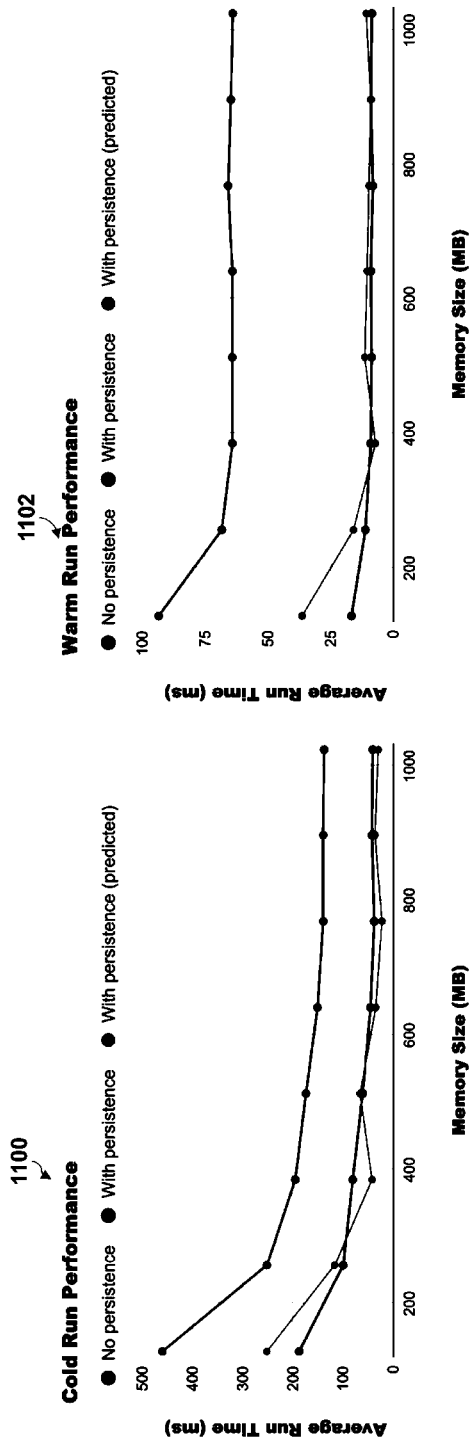
FIGS. 11-12 are graphs representing the performance of cold and warm run performance (no persistence vs persistence in memory), respectively, for a social media analytics application, according to an embodiment of the invention.
Figure 13:
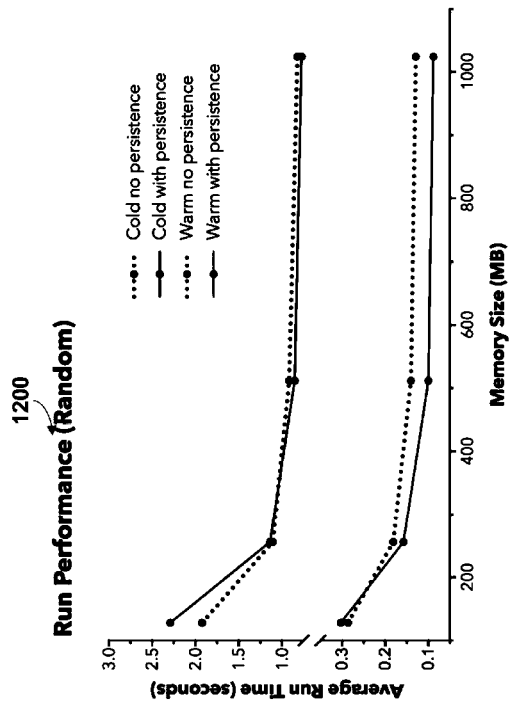
FIGS. 13-14 are graphs representing the performance of cold and warm run performance (no persistence vs persistence on database), respectively, for a social media analytics application, according to an embodiment of the invention.
Figure 14:
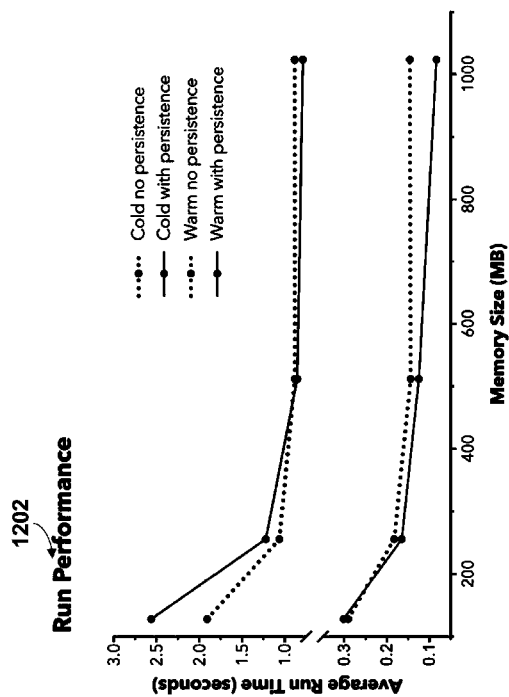

Referring now to FIG. 11, the cold and warm run performance (no persistence vs persistence in memory) for the reference social media analytics application, is described in more detail. A series of functions were developed and deployed into AWS Lambda and tested for two different conditions: 1) single tweet text and 2) random tweet text. The functions ran in a cold and warm state, each with different memory sizes. AWS Comprehend is used to analyze the text and derive the sentiment. AWS API Gateway is used as the RESTful API to handle incoming GET request from the client. To evaluate the performance of RaaS approach over FaaS the run times of the functions in RaaS and FaaS versions of the reference application are measured. For the FaaS version, a Lambda function is set up in the AWS Lambda service, which computes sentiments using the AWS Comprehend service. Whereas in the RaaS version, a Lambda function is set up in the AWS Lambda service along with a persistent helper service that computes and stores sentiments in memory. The cold run and warm run performance of the functions in the FaaS and RaaS versions is evaluated. The cold runs measure the behavior of functions when provisioned for the very first time. A number of measurements of function run times were taken by varying the container memory size. Chart 1100 shows the cold run performance and chart 1102 shows the warm run performance for FaaS and RaaS versions. For reference, the predicted performance with persistence, which is estimated using the model shown in FIG. 10 is also shown. As seen from the cold and warm run charts, the predicted performance closely matches the actual performance.

Referring now to FIG. 12, the cold and warm run performance (no persistence vs persistence on database) for the reference social media analytics application, is described in more detail. Charts 1200 and 1202 show the results for an alternative implementation of persistent helper service that computes and stores sentiments in a NoSQL database instead of memory. For the single tweet text condition, a single tweet is extracted from a training dataset that contains 5,000 tweets. The first test consisted of sentiment analysis on the text without persisting the data, and as performed in both a cold and warm state. For the second test, the text was persisted in the database for both cold and warm states. In the random test condition, the training dataset is used to randomly sample the sentiment analysis in both states.

In both the cold and warm run experiments (with persistence in memory as shown in FIG. 11 and persistence in database as shown in FIG. 12), it is observed that the average run time improves by increasing the memory allocated. This happens because the CPU capacity allocated to containers executing the functions also increases as the memory allocated is increased. AWS Lambda states that every time memory is doubled, the CPU capacity is also doubled. Further, it is observed that the RaaS approach (with persistence) outperforms the FaaS approach (no persistence).

As one of ordinary skill in the art will appreciate, the above-recited servers may comprise all necessary hardware, including, but not limited to, a processor, memory operably coupled to the processor, a storage device, such as a hard drive, coupled to the processor, and a network communication device coupled to the processor. The processor may be any type of processor as is known in the art, including, but not limited to, integrated circuits, microprocessors, field programmable gate assemblies, and the like. The storage may be any type of storage device as is known in the art, including, but not limited to, hard disk drives, solid state drives, flash drives, secure digital (SD) drives, including Mini SD cards and Micro SD cards, compact flash (CF) cards, and the like. The network communication device may be any device operable to communicate across a network, including but not limited to, an Ethernet card, a Wi-Fi device, a Bluetooth device, a Zigbee device or any other IEEE 802.XX compliant device, a cellular communication device, and the like. Accordingly, the servers described above may be operable to communicate across a network, including wide access networks (WANs) such as the internet, local area networks (LANs), and personal area networks (PANs). Some of the illustrative aspects of the present invention may be advantageous in solving the problems herein described and other problems not discussed which are discoverable by a skilled artisan.

Figure 15B:
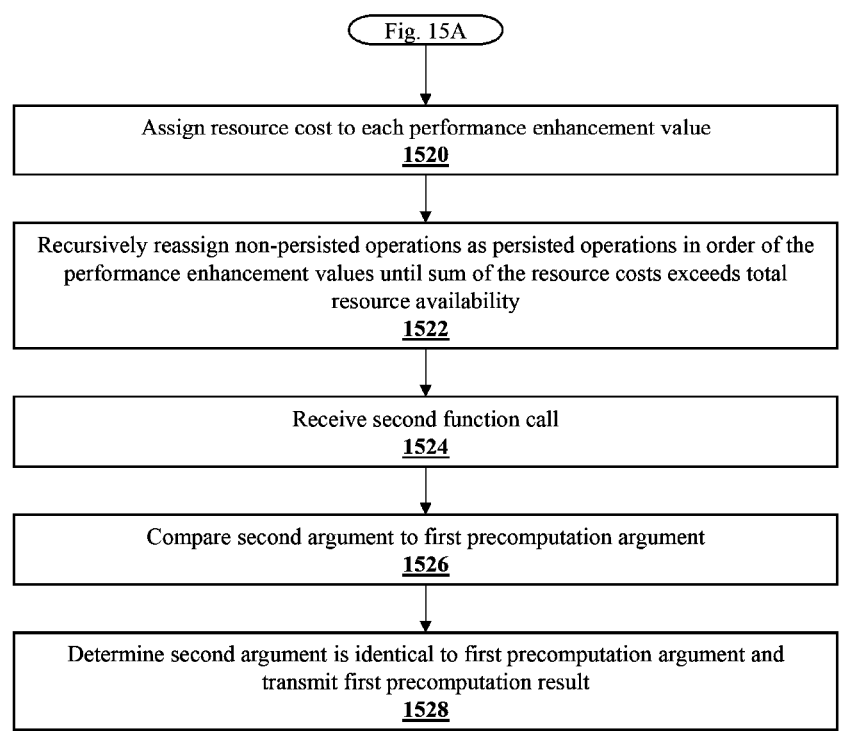

Referring now to FIGS. 15A-B, a method 1500 according to an embodiment of the invention is presented. The method 1500 comprises receiving a first function call comprising a first argument at step 1502. The method 1500 may continue at step 1504 with performing a first function responsive to the first argument comprised by the first function call, producing a first function result. The method 1500 may continue at step 1506 with generating a first precomputation argument that differs from the first argument responsive to the first function call and at step 1508 with executing a first persistent function responsive to the first precomputation argument, the first persistent function comprising performing at least one precomputation operation, the at least one precomputation operation comprising performing the first function responsive to the first precomputation argument, producing a first precomputation result The first precomputation result generated at step 1508 may be stored at step 1510. The method 1500 may continue at 1512 with identifying one or more operations comprised by the first function that are persisted, defining persisted operations. The method 1500 may continue at 1514 with identifying one or more operations comprised by the first function that are not persisted, defining non-persisted operations, at step 1516 with determining a total resource availability, and at step 1518 with determining a performance enhancement value for each non-persisted operation by comparing a time to perform the non-persisted operation with a time to perform the non-persisted operation if it were persisted. Once the performance enhancement values are determined, each performance enhancement value may be assigned a resource cost, being the resource cost to persist each non-persisted function, at step 1520. The method 1500 may continue at 1522 with recursively reassigning the non-persisted operations as persisted operations in order of the performance enhancement values, defining reassigned operations, until a sum of the resource costs for the reassigned operations would exceed the total resource availability, i.e. would consume more resources than are available. The method 1500 may continue at 1524 with receiving a second function call comprising a second argument, at 1526 with comparing the second argument to the first precomputation argument, and finish at 1528 with, upon determining the second argument is identical to the first precomputation argument, transmitting the first precomputation result from a source of the second function call.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A method for improving performance of functions-as-a-service comprising:
   receiving a first function call comprising a first argument;
   performing a first function responsive to the first argument comprised by the first function call, producing a first function result;
   generating a first precomputation argument that differs from the first argument responsive to the first function call;
   executing a first persistent function responsive to the first precomputation argument, the first persistent function comprising performing at least one precomputation operation, the at least one precomputation operation comprising performing the first function responsive to the first precomputation argument, producing a first precomputation result;
   storing the first precomputation result;
   identifying one or more operations comprised by the first function that are persisted, defining persisted operations;
   identifying one or more operations comprised by the first function that are not persisted, defining non-persisted operations;
   determining a total resource availability;
   determining a performance enhancement value for each non-persisted operation by comparing a time to perform the non-persisted operation with a time to perform the non-persisted operation if it were persisted;
   assigning a resource cost to each performance enhancement value;
   recursively reassigning the non-persisted operations as persisted operations in order of the performance enhancement values, defining reassigned operations, until a sum of the resource costs for the reassigned operations would exceed the total resource availability;
   receiving a second function call comprising a second argument;

comparing the second argument to the first precomputation argument; and upon determining the second argument is identical to the first precomputation argument, transmitting the first precomputation result from a source of the second function call.

2. The method of claim 1 further comprising storing the first precomputation result in memory.

3. The method of claim 1 further comprising storing the first precomputation result in a result database.

4. The method of claim 1 wherein the first persistent function is stateful.

5. The method of claim 1 further comprising retrieving the first precomputation result using remote direct memory access.

6. The method of claim 1 wherein:

the total resource availability is at least one of a total memory availability, a total read/write availability, and a storage availability; and the resource cost is at least one of memory used in persisting the non-persisted operation, read/write utilization in persisting the non-persisted operation, and storage utilized in persisting the non-persisted operation.

7. The method of claim 1 wherein the non-persisted operations are reassigned as persisted operations responsive to having the largest performance enhancement value.

8. The method of claim 1 wherein the non-persisted operations are reassigned as persisted operations responsive to having a largest ratio of performance enhancement value to the resource cost.

9. The method of claim 1 comprising:

caching an image of the first function;

creating a first container consisting of the first function;

storing the first container in a function container pool;

caching an image of the first persistent function;

creating a first persistent container consisting of the first persistent function; and storing the first persistent container in a persistent function container pool.

10. The method of claim 9 wherein executing the first persistent function comprises executing the first persistent container.

11. The method of claim 10 further comprising retrieving the first persistent result using remote direct memory access.

12. A method for improving performance of functions-as-a-service comprising:

receiving a first function call comprising a first argument;

performing a first function responsive to the first argument comprised by the first function call, producing a first function result;

generating a first precomputation argument that differs from the first argument responsive to the first function call;

executing a first persistent function responsive to the first precomputation argument, the first persistent function comprising performing at least one precomputation operation, the at least one precomputation operation comprising performing the first function responsive to the first precomputation argument, producing a first precomputation result;

storing the first precomputation result in at least one of memory and a result database;

identifying one or more operations comprised by the first function that are persisted, defining persisted operations;

identifying one or more operations comprised by the first function that are not persisted, defining non-persisted operations;

determining a total resource availability;

determining a performance enhancement value for each non-persisted operation by comparing a time to perform the non-persisted operation with a time to perform the non-persisted operation if it were persisted;

assigning a resource cost to each performance enhancement value;

recursively reassigning the non-persisted operations as persisted operations in order of the performance enhancement values, defining reassigned operations, until a sum of the resource costs for the reassigned operations would exceed the total resource availability;

receiving a second function call comprising a second argument;

comparing the second argument to the first precomputation argument; and upon determining the second argument is identical to the first precomputation argument, transmitting the first precomputation result from a source of the second function call;

wherein the first persistent function is stateful.

13. The method of claim 12 wherein:

the total resource availability is at least one of a total memory availability, a total read/write availability, and a storage availability; and the resource cost is at least one of memory used in persisting the non-persisted operation, read/write utilization in persisting the non-persisted operation, and storage utilized in persisting the non-persisted operation.

14. The method of claim 12 wherein the non-persisted operations are reassigned as persisted operations responsive to having the largest performance enhancement value.

15. The method of claim 12 wherein the non-persisted operations are reassigned as persisted operations responsive to having a largest ratio of performance enhancement value to the resource cost.

16. The method of claim 12 further comprising retrieving the first precomputation result using remote direct memory access.

* * * * *